(12) United States Patent
West

(10) Patent No.: US 8,427,615 B2
(45) Date of Patent: Apr. 23, 2013

(54) TRANSPARENT CONDUCTING ELECTRODES AND METHOD FOR PRODUCING

(75) Inventor: John L. West, Hartville, OH (US)

(73) Assignee: Kent State University, Kent, OH (US)

(*) Notice: Subject to any disclaimer, the term of this patent is extended or adjusted under 35 U.S.C. 154(b) by 518 days.

(21) Appl. No.: 12/718,437

(22) Filed: Mar. 5, 2010

(65) Prior Publication Data

US 2010/0225868 A1 Sep. 9, 2010

Related U.S. Application Data

(60) Provisional application No. 61/157,771, filed on Mar. 5, 2009.

(51) Int. Cl.
*G02F 1/1343* (2006.01)

(52) U.S. Cl.
USPC .......................................................... 349/139

(58) Field of Classification Search ........................ None
See application file for complete search history.

(56) References Cited

U.S. PATENT DOCUMENTS

| | | | |
|---|---|---|---|
| 5,317,438 A | 5/1994 | Suzuki et al. | |
| 6,559,918 B1 | 5/2003 | Lueder | |
| 7,170,481 B2 | 1/2007 | Doane et al. | |
| 7,236,151 B2 | 6/2007 | Doane et al. | |
| 7,355,668 B2 | 4/2008 | Kumar et al. | |
| 7,737,928 B2 | 6/2010 | Huang et al. | |
| 7,773,064 B2 | 8/2010 | Doane et al. | |
| 7,791,700 B2 | 9/2010 | Bellamy | |
| 7,796,103 B2 | 9/2010 | Doane et al. | |
| 2006/0109414 A1 | 5/2006 | Liao et al. | |
| 2006/0132427 A1* | 6/2006 | Weisberg et al. | 345/107 |
| 2007/0064175 A1* | 3/2007 | Kim et al. | 349/86 |
| 2007/0091232 A1 | 4/2007 | Kim et al. | |
| 2007/0126674 A1 | 6/2007 | Doane et al. | |
| 2008/0158470 A1 | 7/2008 | Chung et al. | |
| 2008/0291380 A1 | 11/2008 | Sakikubo | |
| 2009/0033811 A1 | 2/2009 | Schneider | |
| 2009/0040415 A1 | 2/2009 | Kim | |
| 2009/0096942 A1 | 4/2009 | Schneider et al. | |
| 2010/0059273 A1 | 3/2010 | Montbach et al. | |
| 2010/0141689 A1 | 6/2010 | Johnson | |
| 2010/0157180 A1 | 6/2010 | Doane et al. | |
| 2010/0245221 A1 | 9/2010 | Khan | |

* cited by examiner

*Primary Examiner* — Thanh-Nhan P Nguyen

(74) *Attorney, Agent, or Firm* — Hahn Loeser & Parks, LLP; Scott M. Oldham

(57) ABSTRACT

The invention relates to flexible liquid crystal devices and methods, and the electrically conducting backplane of a liquid crystal display for example. A substrate is provided that supports components of a liquid crystal display including a liquid crystal layer that is electrically addressed to produce images. The substrate can be flexible or drapable. An electrode arrangement is formed on the substrate, which includes a plurality of small islands or zones of highly conductive material. The highly conductive islands or zones may be dimensioned to be smaller than the dimensions of the electrode pattern, and are electrically isolated from one another. The plurality of islands or zones are then connected in a predetermined pattern by a conducting polymer layer having a predetermined configuration to provide the desired electrode pattern.

20 Claims, 3 Drawing Sheets

TRANSPARENT CONDUCTING ELECTRODES AND METHOD FOR PRODUCING

CROSS-REFERENCE TO RELATED APPLICATION/INCORPORATION BY REFERENCE

This U.S. Patent Application claims priority to and the benefit of U.S. provisional patent application Ser. No. 61/157,771, filed on Mar. 5, 2009, which is incorporated herein by reference in its entirety.

FIELD OF THE INVENTION

The present invention relates to liquid crystal displays, and printed flexible electrodes and methods for printing electrodes for use in flexible liquid crystal displays.

DESCRIPTION OF RELATED ART

Liquid crystal display (LCD) technology has become ubiquitous in information display technology, and provides a flat-panel display of light weight and low power which provides a visual read out that conforms to the small size, weight and battery demands of a handheld electronic devices and many other applications. Commercially, the LCD first appeared in volume as a digital readout on wrist watches, then on instruments and, later, enabled the laptop computer, personal data assistant and many other digital devices. Today LCD technology is replacing cathode ray tubes in televisions and PCs.

In the past, commercial LCD displays manufactured and sold were typically made on glass substrates. Glass offers many features suitable for the manufacture of LCD's. It can be processed at high temperatures, it is rigid and suitably rugged for batch processing methods used in high volume manufacturing, its surface can be made very smooth and uniform over large areas and it has desirable optical properties such as high transparency. There are many applications, however, where glass is far from being the ideal substrate material. Glass substrates cannot be made flexible and are not very rugged, being unsuitable for web manufacturing and subject to easy breakage. For many applications, it would be desirable to have a flexible display, and as a result, there have been efforts to develop displays on more flexible and rugged substrates that cannot only conform to three-dimensional configurations but which can also be repeatedly flexed, and not be subject to damage as easily as a glass substrate display. For example, it would be desirable to provide a display having the flexibility of a thin plastic sheet, paper or fabric, so that it can be rolled up or folded like paper or cloth, making the display more portable, and opening up new applications in which displays could be used. For example, a flexible display could be used much as a newspaper or magazine is presently, with information selectively displayed on one or more "pages" rather than printed as in a newspaper or magazine. Many other applications could be realized as should be recognized.

In LCD technology, the glass substrate displays are electrically addressable for fast switching between liquid crystal states. The ability to provide an electrically addressable liquid crystal display in a flexible mode would be advantageous for any LCD technology, and because of their ease of manufacture and optics are currently being commercialized using cholesteric liquid crystal displays. Cholesteric displays can be made highly reflective such that they can be seen in bright daylight or a dimly lit room without the aid of a heavy and power consuming backlight. Since cholesteric liquid crystals can be made to be bistable they require power only when being addressed, further adding to the power savings associated with such displays. Cholesteric liquid crystalline materials are also unique in their optical and electro-optical features, and therefore provide a desirable material for use in LCD applications. The cholesteric material can be electrically switched to either one of two stable textures, planar or focal conic, or to a homeotropically aligned state if a suitably high electric field is applied. In the planar texture the helical axis is oriented essentially perpendicular to the substrate to Bragg reflect light in a selected wavelength band whereas in the focal conic texture it is oriented, on the average, parallel to the substrate so that the material is transparent to all wavelengths except for weak light scattering, negligible on an adjacent dark background. These bistable structures can be electronically switched between each other at rapid rates on the order of milliseconds. Gray scale is also available in that only a portion of a pixel can be switched to the reflective state thereby controlling the reflective intensity.

Bistable cholesteric liquid crystal displays also have several important electronic drive features that make them desirable. For example, in addressing a matrix display of many pixels, a voltage threshold may be used for multiplexing a row/column matrix without the need of an expensive active matrix (transistor at each pixel). Bistability with a voltage threshold allows very high-resolution displays to be produced with low-cost passive matrix technology.

Cholesteric liquid crystals are particularly well suited for flexible substrates, wherein two flexible substrates are filled with cholesteric liquid crystal materials therebetween. The substrates may be transparent or may be formed as a reflective display that does not require a transparent substrate, allowing a broad range of substrate materials to be used. In a flexible display, a problem relates to properly providing electrical drive signals to the individual pixels of the display. As it is desired to provide a display which can be manufactured simply and at low cost, providing electrical conductors for operating the display which can provide adequate conductivity to pixels of a flexible display while meeting these objectives is difficult. The use of highly conductive materials in flexible displays can be problematic, as such materials may not be flexible themselves, and even if flexible, may be costly in terms of the materials themselves or regarding the techniques of manufacturing the desired electrode patterns. It would be advantageous to provide a conducting electrode pattern or arrangement which can be used in flexible LCD applications which avoids such problems.

In other applications beyond liquid crystal displays, such as radio frequency identification tags or technologies, electronics, battery technologies and photovoltaic technologies for example, providing a highly conducting layer on a flexible substrate in a simple and cost-effective manner may also be important.

SUMMARY OF THE INVENTION

In one aspect, the invention relates to the electrically conducting backplane of a liquid crystal display, wherein the backplane is simply produced at low cost in association with a substrate associated with the display. In an example, a substrate as defined herein is a structure that supports components of a liquid crystal display including a liquid crystal layer that is electrically addressed to produce images. The substrate need not be rigid, but can be flexible or drapable. Glass, metal, polymer, paper and fabric or textile can all be used as substrate materials. The substrate is a generally thin layer, but is often significantly thicker than other components of the display. The substrate may have various components associated with it such as electrodes, an active or passive matrix backplane, solar cell, photovoltaic device and the like. The present invention is usable in connection with displays employing one, two, or more substrates. The conducting layer may be formed by printing techniques, such as ink jet printing techniques, or coating techniques.

In another example, the invention is directed to an electrode arrangement comprising a substrate which is provided with an electrode pattern. The electrode pattern includes a plurality of small islands or zones of highly conductive material. The highly conductive islands or zones may be dimensioned to be smaller than the dimensions of the electrode pattern, and are electrically isolated from one another. The plurality of islands or zones are then connected in a predetermined pattern by a conducting polymer layer having a predetermined configuration to provide the desired electrode pattern.

The invention also relates to methods of producing conducting electrode patterns or arrangements for use in liquid crystal display technology or other applications. The method according to an example comprises providing at least one substrate and providing a predetermined electrode pattern thereon. The predetermined electrode pattern includes a plurality of islands or zones of a metallic or metallic oxide film material on at least one substrate. The plurality of islands or zones are arranged in a desired pattern on the substrate. The plurality of islands or zones are electrically isolated from one another and are dimensioned in an array which is smaller than the dimensions of the predetermined electrode pattern. The predetermined electrode pattern further includes a conductive polymer layer overlaying the plurality of islands or zones, and formed in a predetermined pattern in association with the plurality of zones or islands.

In view of the foregoing, it is desirable to provide an electrode arrangement and methods of producing an electrode arrangement using a combination of transparent conducting polymer and metallic or metallic oxide films, such as to produce the backplane for a liquid crystal display device, thus greatly simplifying and lowering the cost of producing conducting backplanes.

DESCRIPTION OF THE INVENTION

Figure 1:
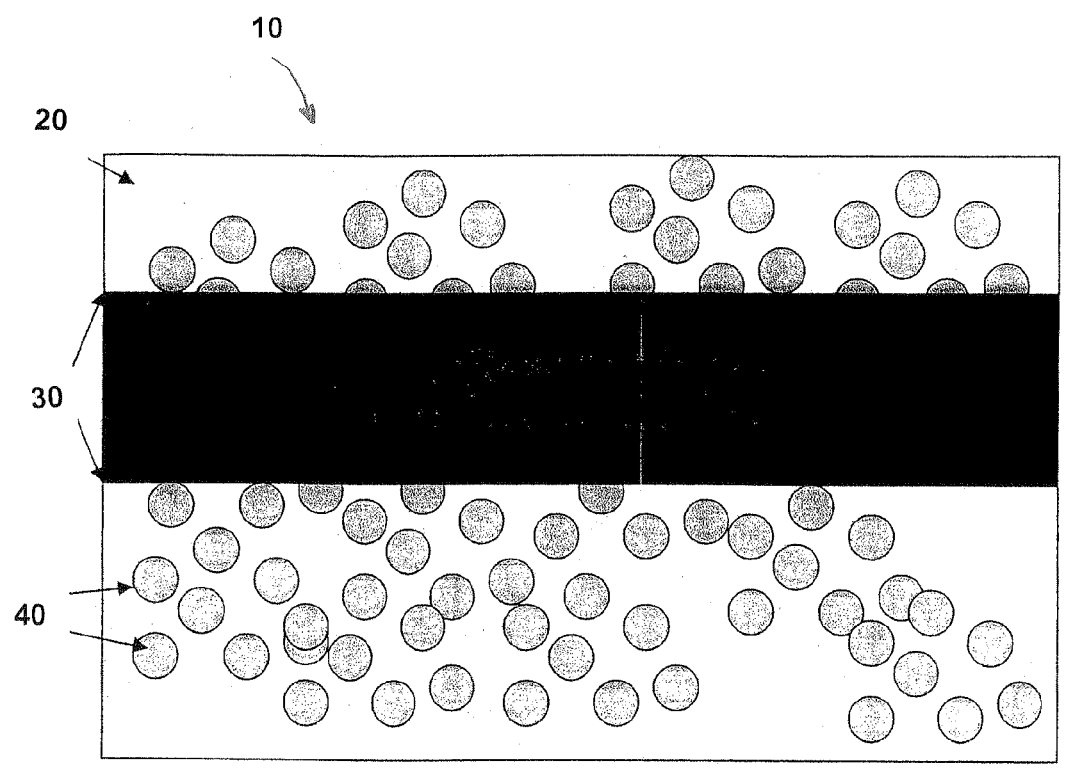
FIG. 1 shows a diagrammatic illustration of a display a configuration according to the invention.

In reference to FIG. 1, there is shown a schematic view of an example of this invention. The electrode pattern 10 shown in FIG. 1 is formed on a first flexible substrate 20 is covered by small islands or zones of a highly conductive material 40. The zones of highly conductive material 40 may be formed of a variety of materials, such as indium-tin-oxide, which is transparent and useful for LC display applications for example. Alternatively, where transparency is not important, highly conductive metal films such as produced of aluminum, silver or gold could be used, or materials such as carbon nanotubes, metal or carbon conductive inks or other suitable highly conductive materials may be used. The highly conductive islands or zones 40 together are formed in a predetermined pattern for a particular use, such as in association with pixel elements of an LC display in an active electrode matrix for example. The pattern of highly conductive islands or zones 40 are formed with a dimension that is smaller than the dimensions of an electrode pattern 10 as a whole, and are electrically isolated from one another on substrate 20. The plurality of islands or zones 40 are then connected in a predetermined pattern by a lower conductivity layer 30 having a predetermined configuration to provide an electrically conducting electrode pattern in conjunction with the islands or zones 40. The lower conductivity layer 30 may be formed of a transparent conducting polymer for example. The electrode pattern as described could be formed and used as an active or passive matrix backplane for electrically addressing a liquid crystal display.

In this example, the electrically conductive islands or zones formed of a highly conductive material 40 provide desired conductivity characteristics, which when combined with the conducting polymer provide a desired pattern of conducting electrodes for a passive matrix or an active backplane for use in a liquid crystal display. Other applications using a plurality of islands or zones 40 of a higher conductivity material combined with a lower conductivity polymeric material layer are also contemplated, such as for RFID systems, electronic systems, battery configurations and photovoltaics. The conducting polymer layer 40 may be printed using a low cost printing technique, and provide flexibility of the conducting layer, without the bending or draping of the flexible substrate 20 causing deterioration of the highly conductive zones 40.

The small islands or zones 40 may be created during the deposition of the conducting film or by breaking a continuous film, or by any other suitable means known to one having ordinary skill in the art. In an example, for a LC display, the small islands or zones 40 may be formed of a transparent Indium-tin-oxide (ITO) or other metallic oxide film materials, for good transparency. The zones 40 of ITO are formed at the location of pixels in the LC display for example, to provide an active matrix backplane for electrically addressing the display.

Thereafter, a transparent conductive polymer 30 is deposited over the array of highly conductive zones 40. The conductive polymer 30 may be printed using known, low-cost printing techniques, into a desired pattern or configuration. The conducting polymer layer may be provided using potentially many methods of applying and patterning the conductors. The conductors may be printed in some specified pattern, using known techniques such as ink jet, screen or off-set printing, or other printing techniques as examples. Alternatively, the conducting polymer materials may be sprayed or coated onto the underlying surface (such as the dye layer, protective layer, casting layer or substrate) using a mask, stencil or pretreating the surface to form a chemical mask which allows the conducting polymer material to only adhere to certain areas. In some cases it may be desirable to first lay down a uniform conducting coat and subsequently pattern the layer by chemically or mechanically deactivating or etching regions of conductive material. In fact, it is contemplated that even the substrate itself can be manufactured as the conductor. The highly conducting zones or islands 40 may also be formed in a number of ways, for example, during deposition of the conducting film or by breaking a continuous film or by other suitable methods. For example, some flexible plastic materials may be manufactured with an indium tin oxide (ITO) coating that may be patterned into the desired plurality of islands or zones. Suitable electrode materials for each of the highly conductive zones and lower conductivity layer interconnecting the highly conducting zones will be apparent to those of ordinary skill in the art in view of the instant disclosure. Electrode materials which are self leveling and which can be used in suitable thicknesses to obviate the need for a planarization layer may be used. The aforementioned highly conductive zones or islands can be patterned, formed into pixels of varying shapes or sizes, aligned into rows and columns so as to form a passive matrix and so on, as is apparent to those of ordinary skill in the art. The lower conductivity layer 30, such as a conductive polymer layer 30, electrically connects the small islands 40 in a pattern determined by said conductive polymer layer 30.

The conducting layer of conductive polymer can be electrically addressed by adding suitable electrical interconnects to allow drive electronics to be connected to the electrodes of a LC display. While the invention will be described herein primarily in conjunction with a LC display, and the use of cholesteric liquid crystals, any liquid crystal material that can be adapted for use in connection with the foregoing substrates will be suitable in the present invention. Such materials include, by way of example only, nematic, chiral nematic (cholesteric), smectic and ferroelectric smectic liquid crystal materials. They include materials that are bistable and those that are not bistable. They include cholesteric or chiral nematic liquid crystals having positive or negative dielectric anisotropy or a combination of negative and positive with a crossover frequency suitable for dual frequency addressing. They include cholesteric materials having pitch lengths reflecting in the visible spectrum as well as those having pitch lengths reflecting outside the visible spectrum, including ultraviolet and infrared. Preferred liquid crystal materials for use in the present invention are bistable cholesteric (chiral nematic) liquid crystals having positive dielectric anisotropy and planar and focal conic textures that are stable in an absence of an electric field. For example, nematic materials with a high birefringence and dielectric anisotropy with a chiral additive to twist the material to a pitch length to reflect in the visible spectrum may be used. Cholesteric liquid crystal layers are stackable, and light is inherently reflected by the cholesteric liquid material at preselected wavelengths and bandwidth and is transparent to other wavelengths. Cholesteric materials can be tuned to reflect at any desired wavelength or color and bandwidth for full color displays with stacks of the primary colors red, green and blue (RGB), or can employ dispersions containing cholesteric liquid crystal-containing droplets in a polymer matrix that reflect red, green and blue light in a single layer.

The liquid crystal layer may be bounded by conducting electrodes according to the invention. The electrodes need not be identical. For example, in examples, the electrode on the non-viewing side of the liquid crystal display may be black or some other color, while the electrode on the viewing side may be transparent. In other examples, the electrodes on both sides of the liquid crystal layer may be transparent.

Any means for addressing the liquid crystal known in the art, and preferably adaptable to a display having deformability may be used. In examples of electrically addressable displays, the means for addressing the liquid crystal will be drive and control electronics operatively linked to the electrodes 10 for application of driving voltages across the liquid crystal material in accordance with any suitable drive scheme known to those of ordinary skill in the art. Examples of suitable drive schemes and electronics include, but are not limited to, the conventional drive scheme disclosed in U.S. Pat. No. 5,644,330 implemented with either bipolar or unipolar drive chips, the dynamic drive scheme disclosed in U.S. Pat. No. 5,748,277 or U.S. Pat. No. 6,154,190 for faster or lower temperature response, the cumulative drive scheme disclosed in U.S. Pat. No. 6,133,895, for near video response, and the Multiconfiguration Display Driver disclosed in the Ser. No. 10/782,461 patent application, or other known techniques for example. Alternatively, the means for addressing can be an optical method whereby the image is written on the display with white light or laser light in a manner such as disclosed in H. Yoshida et al., Journal of the SID, Vol. 5/3, 269-274, (1997). In these embodiments, the displays can be fabricated without patterned electrodes. The ledges of substrates where the ends of electrodes are located may be left accessible for interconnecting the drive electronics and electrode layers may extend beyond the periphery of the other layers of the display for interconnecting the drive electronics for example.

Figure 3:
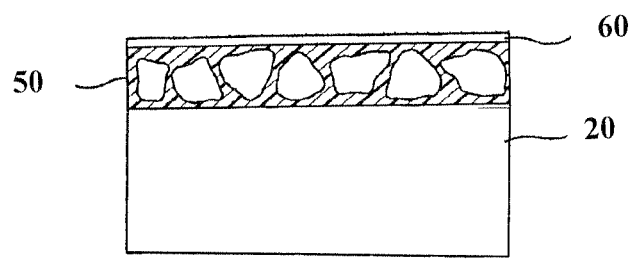
FIG. 3 is a schematic side view of the configuration shown in FIG. 1.

In an example, an electrode pattern 10 in accordance with the invention for use in a LC display device is configured where the plurality of islands 40 are positioned, and the conducting polymer layer 30 is printed or otherwise patterned in the form of parallel strips to form rows of parallel conducting electrodes. As seen in FIG. 3, a LC droplet dispersion 50, such as cholesteric liquid crystals formed into a polymer droplet dispersion, is then coated on top of the rows of conductors, followed by a transparent electrical conductor 60 which is then printed, or otherwise coated and patterned on top of the droplet dispersion in the form of a plurality of islands or zones 40 and conductive polymer strips (columns) in a direction perpendicular to the rows of conductors that are under the dispersion. In this way, a row and column matrix of electrodes is formed with the conductive polymer layers 30, and the plurality of islands 40 are positioned at the intersections of the conductive polymer layers 30, with the cholesteric dispersion in between. Voltage pulses are then multiplexed in such a way to selectively address each of the pixels of the display formed by the intersection of each row and column. When a high-resolution image is addressed on the display film and the voltage removed, the image will be retained indefinitely until readdressed to form another image.

It may be desirable to employ an electrical insulation layer or layers between the electrodes formed by the individual islands or zones 40 and/or the lower conductivity layer patterns 30, in order to insulate the conductors from each other and thereby minimize the potential for shorting. Such insulating layers or areas may be formed with suitable materials that can be coated, printed, sprayed or otherwise laid down in a layer in the desired locations. The insulation layer should not significantly detract from the deformability or optics of the display. Such materials may include for example gelatin or latex or the like.

As will be apparent to those of ordinary skill in the art, displays according to the invention can be formed in many different configurations using electrode patterns 10 according to the invention, and in conjunction with other known component layers. The minimum requirements for the electrically addressable transfer display of the invention are at least one liquid crystal layer and at least one adjacent conducting electrode layer. The liquid crystal layer may be sandwiched between the electrode layer and another conducting electrode layer that is a component of the display, such as on a further substrate. Beyond this, there are multiple possible configurations and combinations which can effectively take advantage of the flexibility and/or drapability of the substrates according to the invention, as will be apparent to those of ordinary skill in the art in view of the present disclosure.

The fabrication of the islands or zones 40 and conductive layer 30 may involve printing, coating or other deposition techniques to form the liquid crystal material display electrodes 10, as well as any insulating, isolation or other coatings. These zones 40 and/or layer 30 may be built on a casting layer in association with a substrate. Those of ordinary skill in the art can select and employ suitable coating, printing and deposition techniques including, but not limited to, air brushing, ink jet, spin coating and spray printing, optionally in conjunction with various masks or stencils known in the art, screen printing, photolithography, chemical masking and so on, depending upon the particular layers, substrates or display elements used. It is contemplated that any contact or non-contact method of applying coatings and conductors known in the art will be suitable for use in accordance with the invention.

Thus, for use in preparing LC displays, the electrode configuration 10 allows for flexible displays to be produced both cost-effectively and simply, taking advantage of the high conductivity materials in use to form the islands or zones 40, and the low conductivity layer 30 to interconnect the zones 40. The substrates used in conjunction with such displays may have the characteristics of being highly transparent, as well as having flexibility to allow use in a wide variety of applications, providing very rugged displays, which can be produced using web manufacturing techniques for example. The flexible substrates can conform to three-dimensional configurations, and can be repeatedly flexed, without adverse impact upon the electrode configuration 10. A display can therefore be produced which has the flexibility of a thin plastic sheet, paper or fabric, so that it can be draped, rolled up or folded like paper or cloth. Such a display would be more portable and easier to carry, and could be used in a multitude of applications well beyond those of the typical flat panel information displays using glass substrates.

A display could also be produced with flexibility using only one flexible substrate. As cholesteric liquid crystals are made suitable for standard coating and printing techniques by forming them into polymer droplet dispersions, such droplet dispersions may be produced to be insensitive to pressure and shear such that an image on a bistable cholesteric display is not readily erased or altered by flexing the substrate. A process may be used to apply a sequence of depositions on a transparent polyester plastic whereby the end product is a display where the images are viewed through the substrate. The use of transparent materials in producing the conductive flexible electrodes according to the invention can form such a single substrate configuration.

Figure 2:
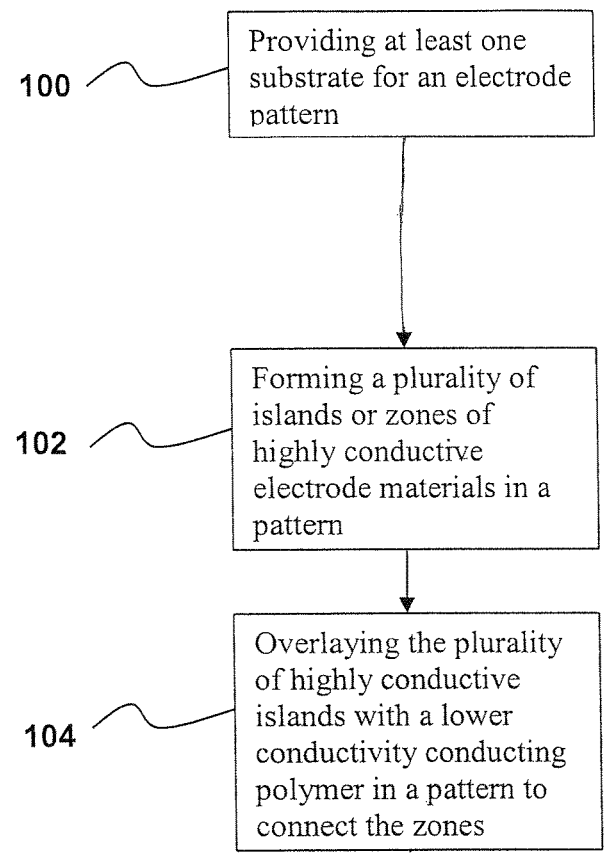
FIG. 2 shows a flow diagram of a method according to an example of the invention.

As seen in FIG. 2, a method of forming an electrode configuration is provided in accordance with the invention. In the method, at least one substrate is provided in a first step at 100 on which a first electrode pattern having predetermined characteristics is formed at 102. The predetermined electrode pattern is formed by creating a plurality of islands or zones of a metallic or metallic oxide film material on the at least one substrate at 102. The plurality of islands or zones are arranged in a desired pattern on the substrate in step 102. The plurality of islands or zones are electrically isolated from one another and are dimensioned in an array which is smaller than the dimensions of the predetermined electrode pattern. The generation of the predetermined electrode pattern further includes forming a conductive polymer layer overlaying the plurality of islands or zones at 104, with the conductive polymer layer formed in a predetermined pattern in association with the plurality of zones or islands. Depending on the use of the electrode pattern, additional steps may be employed. For example, to produce a LC display, the formed electrode pattern may then have a LC material dispersed thereon, and suitable electrical interconnects may be provided to allow drive electronics to be connected to the electrodes of the LC display.

In accordance with the invention, the conducting electrode arrangement provides various advantages. The use of highly conductive materials in predetermined discrete locations in an electrode pattern takes advantage of the high conductivity characteristics while minimizing the use and expense associated with such materials. Further, many high conductive materials do not have desired flexibility, limiting their use in flexible LC displays for example. The provision of discrete islands or zones of highly conductive materials in the electrode pattern allows flexibility without degradation of the highly conductive materials. Such materials are generally not conducive to printing techniques, thereby complicating manufacture and increasing the cost thereof. The use of discrete islands or zones facilitates manufacture and cost-effectiveness of the electrode configuration. At the same time, the use of an overlying lower conductivity layer allows the use of materials, such as conductive polymers, that are possible to apply by printing techniques for cost-effective, simple fabrication, and are flexible materials for facilitating use in flexible LC displays or the like. As such materials are of lower conductivity, a thicker layer would necessarily have to be used to provide desired conductivity characteristics, which would adversely impact transparency thereof, which is overcome by the combination of the use of highly conductive materials at predetermined locations with the lower conductivity material layer.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. Additional features of the invention will become apparent to those skilled in the art upon consideration of the description. Modifications may be made without departing from the spirit and scope of the invention.

What is claimed is:

1. An electrode arrangement comprising a substrate which is provided with an electrode pattern, wherein the electrode pattern includes a plurality of zones of highly conductive material, wherein the highly conductive zones are dimensioned to be smaller than the dimensions of the electrode pattern, and are electrically isolated from one another, a conducting polymer layer overlaying a plurality of the zones and connecting a plurality of zones in a predetermined pattern to provide a predetermined electrode pattern.

2. The arrangement of claim 1, wherein the electrode arrangement is used as a conductive backplane for a liquid crystal display, wherein the conducting backplane is used as an active matrix backplane for electrically addressing the liquid crystal display.

3. The arrangement of claim 1, wherein the electrode arrangement is used as a conductive backplane for a liquid crystal display, wherein the conductive backplane may be used as a passive matrix backplane for electrically addressing the liquid crystal display.

4. The arrangement of claim 1, wherein the conducting polymer layer is printed on the substrate.

5. The arrangement of claim 1, wherein the substrate is flexible and the conducting polymer layer is flexible, allowing bending or draping of the flexible substrate without causing deterioration of the plurality of highly conductive zones.

6. The arrangement of claim 1, further comprising a liquid crystal material dispersed on the formed electrode pattern, and at least one electrical conductor is connected to the electrode pattern to allow drive voltage to be applied to at least a portion of the electrode pattern.

7. The arrangement of claim 1, further comprising cholesteric liquid crystals printed on the conducting polymer layer by forming them into polymer droplet dispersions, wherein such droplet dispersions are produced to be insensitive to pressure and shear such that an image formed on the display is not readily erased or altered by flexing the substrate.

8. The arrangement of claim 1, wherein the electrode arrangement is used as a conductive backplane for a liquid crystal display, with the substrate being a structure that supports components of a liquid crystal display including a liquid crystal layer that is electrically addressed to produce images, the substrate having components including the electrode arrangement forming an active or passive matrix backplane, and formed from a conducting layer, wherein the conducting layer is formed by a printing technique.

9. The arrangement of claim 8, wherein the substrate is flexible.

10. A method of producing a conducting electrode pattern for use in liquid crystal device comprising providing at least one substrate and providing a predetermined electrode pattern thereon, wherein the predetermined electrode pattern includes a plurality of zones of a highly conductive material on at least one substrate, with the plurality of zones arranged in a desired pattern on the at least one substrate such that the plurality of zones are electrically isolated from one another, dimensioning the plurality of zones in an array which is smaller than the dimensions of the predetermined electrode pattern, providing a conductive polymer layer overlaying at least a portion of the plurality of zones, wherein the conductive polymer layer is formed in a predetermined pattern in association with the plurality of zones.

11. A liquid crystal display comprising at least one flexible substrate having an electrode arrangement formed from a plurality of zones of substantially transparent highly conductive material formed on the substrate in a predetermined pattern and having a transparent conducting polymer layer connecting at least a portion of the plurality of zones, wherein the conducting polymer has lower conductivity than the material used to form the plurality of zones, to produce the conducting backplane for a liquid crystal display device.

12. The display of claim 11, wherein the conducting backplane may be used as an active matrix backplane for electrically addressing the liquid crystal display.

13. The display of claim 11, wherein the conducting backplane may be used as a passive matrix backplane for electrically addressing the liquid crystal display.

14. The display of claim 11, wherein the conducting polymer layer is printed on the substrate.

15. The display of claim 11, wherein the conducting polymer layer is flexible along with the flexible substrate, allowing bending or draping of the flexible substrate without causing deterioration of the plurality of highly conductive zones.

16. The display of claim 11, wherein the formed electrode pattern has a liquid crystal material dispersed thereon, and electrical interconnects are provided to allow drive electronics to be connected to the electrodes of the display.

17. The display of claim 11, wherein cholesteric liquid crystals are printed on the conducting polymer layer by forming them into polymer droplet dispersions, wherein such droplet dispersions are produced to be insensitive to pressure and shear such that an image formed on the display is not readily erased or altered by flexing the substrate.

18. A method of producing a flexible liquid crystal display device comprising providing at least one flexible substrate formed from a transparent plastic material and providing a predetermined electrode pattern thereon, wherein the predetermined electrode pattern includes a plurality of zones of a highly conductive material on at least one substrate, with the plurality of zones arranged in a desired pattern on the at least one substrate such that the plurality of zones are electrically isolated from one another, dimensioning the plurality of zones in an array which is smaller than the dimensions of the predetermined electrode pattern, providing a conductive polymer layer overlaying at least a portion of the plurality of zones, wherein the conductive polymer layer is formed in a predetermined pattern in association with the plurality of zones, applying a sequence of depositions of cholesteric liquid crystal polymer droplet dispersions on the substrate and providing electrical interconnects to allow drive electronics to be connected to the electrode pattern, wherein addressing of the liquid crystal material forms images which are viewed through the substrate.

19. The method of claim 18, wherein the conductive layer is formed by a printing technique.

20. The method of claim 18, wherein the cholesteric liquid crystals are printed on the conductive polymer layer by forming them into polymer droplet dispersions, wherein such droplet dispersions are produced to be insensitive to pressure and shear such that an image formed on the display is not readily erased or altered by flexing the substrate.

\* \* \* \* \*